US005870145A

United States Patent [19]

Yada et al.

[11] Patent Number: 5,870,145

[45] Date of Patent: Feb. 9, 1999

[54] ADAPTIVE QUANTIZATION OF VIDEO BASED ON TARGET CODE LENGTH

[75] Inventors: Atsuo Yada; Takuya Kitamura, both of Kanagawa, Japan

[73] Assignee: Sony Corporation, Tokyo, Japan

[21] Appl. No.: 737,015

[22] PCT Filed: Mar. 11, 1996

[86] PCT No.: PCT/JP96/00600

§ 371 Date: Feb. 14, 1997

§ 102(e) Date: Feb. 14, 1997

[87] PCT Pub. No.: WO96/28937

PCT Pub. Date: Sep. 19, 1996

[30] Foreign Application Priority Data

Mar. 9, 1995 [JP] Japan .................................... 7-078280

[51] Int. Cl.$^{6}$ ....................................................... H04N 7/24

[52] U.S. Cl. ............................................................. 348/405

[58] Field of Search .................................... 348/405, 419, 348/415, 409, 390, 384; 382/251, 236, 232; H04N 7/13

[56] References Cited

U.S. PATENT DOCUMENTS

| | | | |
|---|---|---|---|
| 5,150,208 | 9/1992 | Otaka et al. | 348/405 |
| 5,317,397 | 5/1994 | Odaka et al. | 348/416 |
| 5,321,440 | 6/1994 | Yanagihara et al. | 348/408 |
| 5,337,087 | 8/1994 | Mishima | 348/405 |
| 5,349,384 | 9/1994 | Oguro | 348/405 |
| 5,424,779 | 6/1995 | Odaka et al. | 348/416 |
| 5,467,136 | 11/1995 | Odaka et al. | 348/416 |
| 5,489,944 | 2/1996 | Jo | 348/405 |
| 5,530,478 | 6/1996 | Sasaki et al. | 348/405 |
| 5,654,759 | 8/1997 | Augenbraun et al. | 348/405 |

FOREIGN PATENT DOCUMENTS

| | | | |
|---|---|---|---|
| 5-111012 | 4/1993 | Japan . | |
| 5-168001 | 7/1993 | Japan . | |
| 5-217299 | 8/1993 | Japan . | |
| 5-284458 | 10/1993 | Japan | H04N 5/92 |
| 6-113273 | 4/1994 | Japan . | |

*Primary Examiner*—Bryan Tung
*Attorney, Agent, or Firm*—Frommer Lawrence & Haug LLP; William S. Frommer

[57] ABSTRACT

Complexity of information of a video signal is detected to control a quantizing step based on the above complexity. Difference of the said video signal is quantized with different quantizing steps in response to the control. Generated code lengths of a plurality of resultant quantized outputs are compared with a target code length. A quantization index indicative of a quantizing step is determined based on a result of the comparison. The above video signal is quantized with the quantizing step based on the quantization index. The above quantized output is subjected to a variable length encoding processing. Further, when the quantization index is determined, a value of them target quantization index indicative of a target quantizing step size allowing the target code length to be obtained is searched only between two quantization indexes respectively indicating two quantizing steps which allow two generated code lengths most approximate to a value of the target code length.

16 Claims, 7 Drawing Sheets

ADAPTIVE QUANTIZATION OF VIDEO BASED ON TARGET CODE LENGTH

TECHNICAL FIELD

The present invention relates to a method of encoding a video signal and an apparatus therefor which can be applied to an encoding technique employing both motion compensation and DCT.

BACKGROUND ART

In a picture compression system employing combination of motion compensation and DCT (Discrete Cosine Transform) represented by an MPEG (Moving Pictures Expert Group) standard, a code amount is controlled so that a bit stream should be transferred to a transmission line at a desired bit rate. A conventional control of the encoding amount is a feed-back control of a quantizing step based on a relationship between a previous quantizing step and a previous code amount and also on a present mean bit rate.

FIG. 7 shows an example of a picture compression and encoding apparatus employing combination of motion compensation and DCT. A digital input video signal is supplied through an input terminal T1 to a scan converter circuit 1. The scan converter circuit divides a picture of one frame into a large number of macroblocks. According to the MPEG standard, a macroblock of a luminance signal has a size of (16×16) formed of four DCT blocks. Each of macroblocks of color difference signals Cr, Cb each has a size of (8×8) formed of two DCT blocks in the case of (4:2:2). One macroblock is formed of total 8 DCT blocks.

Data converted into data of macroblocks by the scan converter circuit 1 are supplied to a subtracting circuit 2 and to a motion detection unit 3 for calculating a motion vector. The motion detection unit 3 calculates a motion vector with respect to the present macroblock with reference to a reference picture. The motion vector is supplied to a motion compensation unit 4 which carries out motion compensation using the motion vector. In this operation for the motion compensation, a locally coded data described later on is employed as the reference picture for carrying out the same motion compensation as that carried out by the decoder side.

If the data of the macroblock is to be processed for an intraframe coding, then the subtracting circuit 2 supplies the data to a DCT processing unit 5 as it is without carrying out the subtraction processing. If on the other hand the data of the macroblock is to be processed for an interframe coding, the subtracting circuit 2 calculates difference between the data and a picture data from the motion compensation unit 4 and supplies the calculated difference to the DCT processing unit 5.

The DCT processing unit 5 effects the DCT on every DCT block of (8×8) to generate a DCT coefficient data. A quantizer 6 quantizes the coefficient data therefrom with a quantizing step. A variable-length encoder 7 variable-length encodes data quantized by the quantizer 6 (referred to as a quantization level). The variable length encoder 7 outputs data to a buffer 8. A bit stream output from the buffer 8 is supplied to a transmission line through an output terminal T2. The quantizing step of the quantizer 6 is controlled in order to set a bit rate of the output from the buffer 8 constant in response to the bit rate of the transmission line.

The data output from the quantizer 6 is also supplied to an inverse quantizer 9. Data (representative value) output from the inverse quantizer 9 is supplied to an inverse DCT processing unit 10. The inverse DCT processing unit 10 provides a decoded video data of a sample picture. If the video data is one for the intraframe coding, then the video data for the sample picture becomes the data of a local decoded picture as it is. If on the other hand the data is one for the interframe coding, then an adder circuit 11 adds the video data to the video data supplied from the motion-compensated picture unit 4, thereby a decoded picture data being obtained.

When the code amount is controlled, a quantization index indicative of the quantizing step of the quantizer 5 is controlled. A code amount control proposed as a test model in an MPEG2 standard is a code amount control that is a feed back control employing a remaining amount of a virtual buffer and a relationship between a quantization index used upon a previous encoding and an amount of codes generated thereby.

The above conventional code amount control encounters the following problems.

First, since the code amount control is the feed back control, if a damping amount is set smaller, then response becomes faster but the processing becomes oscillatory, and if on the other hand the damping amount is set larger, then the oscillation of the processing is reduced but the response becomes slower.

Secondarily, since the bit rate instantaneously becomes large when a scene of a picture is changed, a reproduced picture becomes erroneous or extremely deteriorated in picture quality.

Thirdly, it is difficult to control frames of a predetermined number to be transferred at a predetermined bit rate.

To solve the above problems, a system of controlling the code amount by a feed forward system is considered. According to this system, an amount of codes generated in an equal-length unit is previously calculated with respect to a plurality of quantizing steps and a proper quantizing step is set within the range in which the amount of the generated codes does not exceed a target amount of codes.

A GOP (Group Of Picture), a frame, a macroblock and so on are considered as the equal-length unit used in such code-amount control of the feed-forward system. The GOP is a picture data formed of one frame or greater. The MPEG2 is established to control the code amount at a GOP unit.

As described above, when the code amount is controlled, a plurality of quantizing steps have different fixed values and one of these quantizing steps is selected for the GOP, which brings the problem that a picture quality of a decoded picture is different depending upon the macroblocks. For example, a picture quality of a macroblock of a minute picture is deteriorated, and conversely that of a macroblock of a flat picture is improved. If picture qualities of the adjacent macroblocks are considerably different from each other as described above, then a block distortion is caused.

Therefore, an object of the present invention is to provide a method of encoding a video signal and an apparatus therefor which can improve a picture quality of a decoded picture by employing a code amount control of a feed-forward system for allowing the control corresponding to a local characteristic of a video signal.

DISCLOSURE OF THE INVENTION

According to the present invention, complexity of information of a video signal is detected to control a quantizing step based on the complexity. Difference of the video signal is quantized with different quantizing steps in response to the control. Generated code lengths of a plurality of resultant quantized outputs are compared with a target code length to determine a quantization index indicative of a quantizing step based on a result of the comparison. The video signal is quantized with the quantizing step based on the quantization index. The quantized output is subjected to a variable length encoding processing.

When the quantization index is determined, a value of the target quantization index indicative of a target quantizing step size allowing the target code length to be obtained is searched only between two quantization indexes respectively indicating two quantizing steps which allow two generated code lengths most approximate to a value of the target code length.

According to this method, it is possible to improve a picture quality of a decoded picture by changing a quantizing step in response to a local characteristic of a picture such as a minute pattern of a macroblock. Since an input video signal is motion-compensated when a code length is estimated, it is unnecessary to provide an arrangement for local decoding corresponding to a plurality of quantizing steps and it is possible to reduce processing steps required for a code amount control, which can simplify the arrangement.

According to the present invention, complexity of information of a video signal is detected to control a quantizing step based on the complexity. Difference of the video signal is quantized with different quantization steps by using first to nth quantizing means in response to control of a means for detecting the complexity. Respective quantized outputs from the first to nth quantizing means are converted into generated code length informations. Generated code length information is compared with a target code length information to determine a target quantization index indicative of a target quantizing step based on a result of the comparison. The video signal is quantized with the quantizing step based on the quantization index. The quantized output is subjected to a variable length encoding processing.

When the quantization index is determined, a value of the target quantization index indicative of a target quantizing step size allowing the target code length to be obtained is searched only between two quantization indexes respectively indicating two quantizing steps which allow two generated code lengths most approximate to a value of the target code length.

According to this method, it is possible to improve a picture quality of a decoded picture by changing a quantizing step in response to a local characteristic of a picture such as a minute pattern of a macroblock. Since an input video signal is motion-compensated when a code length is estimated, it is unnecessary to provide an arrangement for local decoding corresponding to a plurality of quantizing steps and it is possible to reduce processing steps required for a code amount control, which can simplify the arrangement.

According to the present invention, there are provided a complexity detecting means for detecting complexity of information of a video signal to control a quantizing step based on the complexity, a quantization index determining means for quantizing difference of the video signal with different quantizing steps in response to control of the complexity detecting means, comparing generated code lengths of a plurality of resultant quantized outputs with a target code length, and determining a quantization index indicative of a quantizing step based on a result of the comparison, and a quantizing means for quantizing the video signal with the quantizing step based on the quantization index from the quantization index determining means. The quantized output is subjected to a variable length encoding processing.

The quantizing index determining means further searches a value of the target quantization index indicative of a target quantizing step size allowing the target code length to be obtained, only between two quantization indexes respectively indicating two quantizing steps which allow two generated code lengths most approximate to a value of the target code length.

According to this arrangement, it is possible to improve a picture quality of a decoded picture by changing a quantizing step in response to a local characteristic of a picture such as a minute pattern of a macroblock. Since an input video signal is motion-compensated when a code length is estimated, it is unnecessary to provide an arrangement for local decoding corresponding to a plurality of quantizing steps and it is possible to reduce processing steps required for a code amount control, which can simplify the arrangement.

According to the present invention, there are provided a complexity detecting means for detecting complexity of information of a video signal to control a quantizing step based on the complexity, first to nth quantizing means for quantizing difference of the video signal with different quantizing steps in response to control of the complexity detecting means, a converting means for converting respective quantized outputs from the first to nth quantizing means into generated-code-length information, a quantization index determining means for comparing generated code length information from the above converting means with a target code length information to determine a target quantization index based on a result of the comparison, and a quantizing means for quantizing the video signal with the quantizing step based on the quantization index from the above quantization index determining means. The quantized output from the above quantizing means is subjected to a variable length encoding processing.

The quantizing index determining means further searches a value of the target quantization index indicative of a target quantizing step size allowing the target code length to be obtained, only between two quantization indexes respectively indicating two quantizing steps which allow two generated code lengths most approximate to a value of the target code length.

According to this arrangement, it is possible to improve a picture quality of a decoded picture by changing a quantizing step in response to a local characteristic of a picture such as a minute pattern of a macroblock. Since an input video signal is motion-compensated when a code length is estimated, it is unnecessary to provide an arrangement for local decoding corresponding to a plurality of quantizing steps and it is possible to reduce processing steps required for a code amount control, which can simplify the arrangement.

In connection with the above description, a method of encoding a video signal and an apparatus therefor will be disclosed.

BRIEF DESCRIPTION OF DRAWINGS

FIG. 6A is a timing chart showing an output of detected activity.

FIG. 6B is a timing chart showing a DCT output.

FIG. 6C is a timing chart showing a quantized output.

FIG. 6D is a timing chart showing a converted output.

FIG. 6E is a timing chart showing an integrated output.

FIG. 6F is a timing chart showing an FIFO output.

FIG. 6G is a timing chart showing an output of a determined target code length.

FIG. 6H is a timing chart showing an FIFO output.

FIG. 6I is a timing chart showing an output indicative of a result of a binary search processing.

FIG. 6J is a timing chart showing a quantized output.

FIG. 6K is a timing chart showing a variable-length coded output.

BEST MODE CARRYING OUT THE INVENTION

Figure 1:
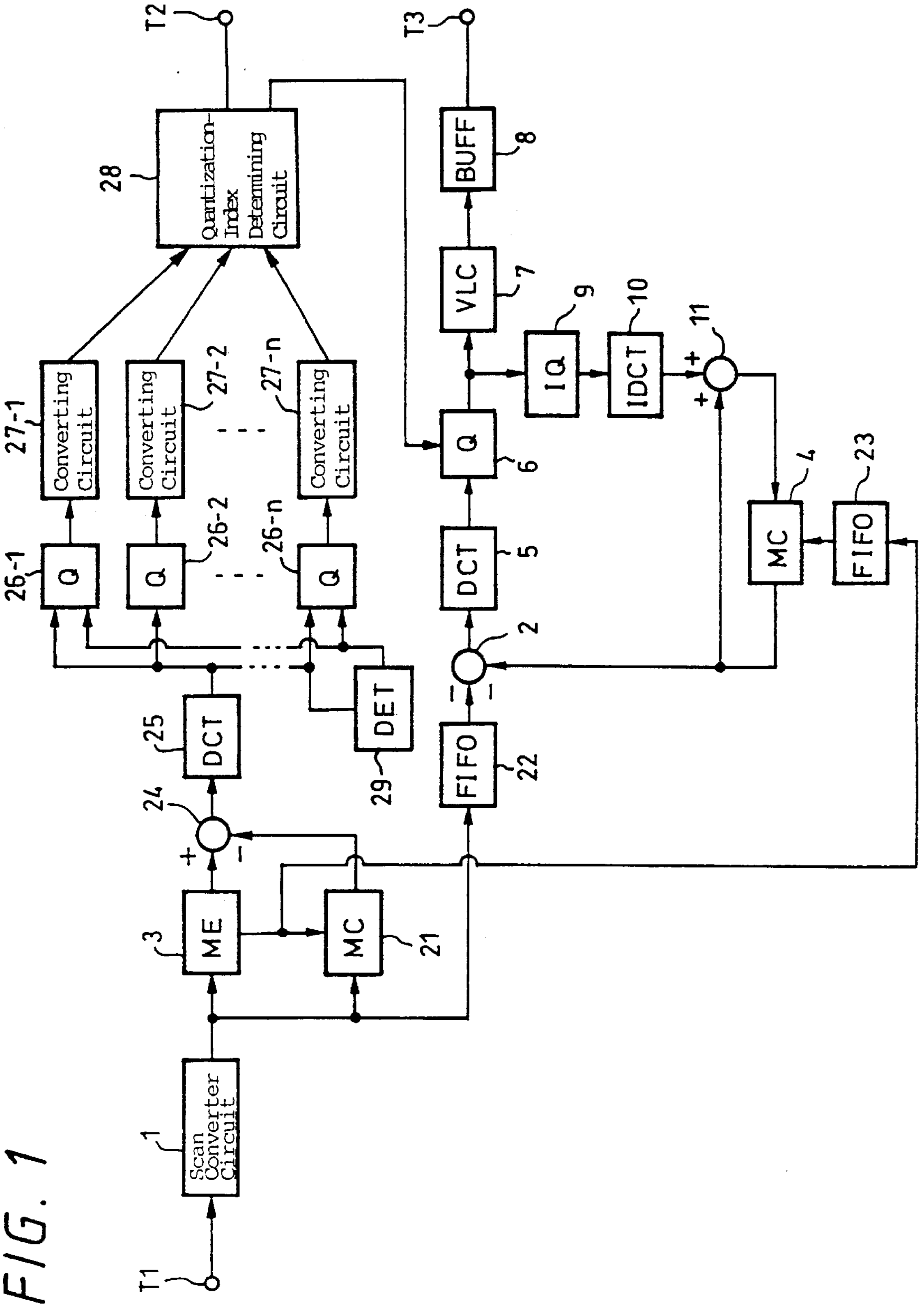
FIG. 1 is a block diagram showing a mode of an encoder for encoding.
Figure 7:
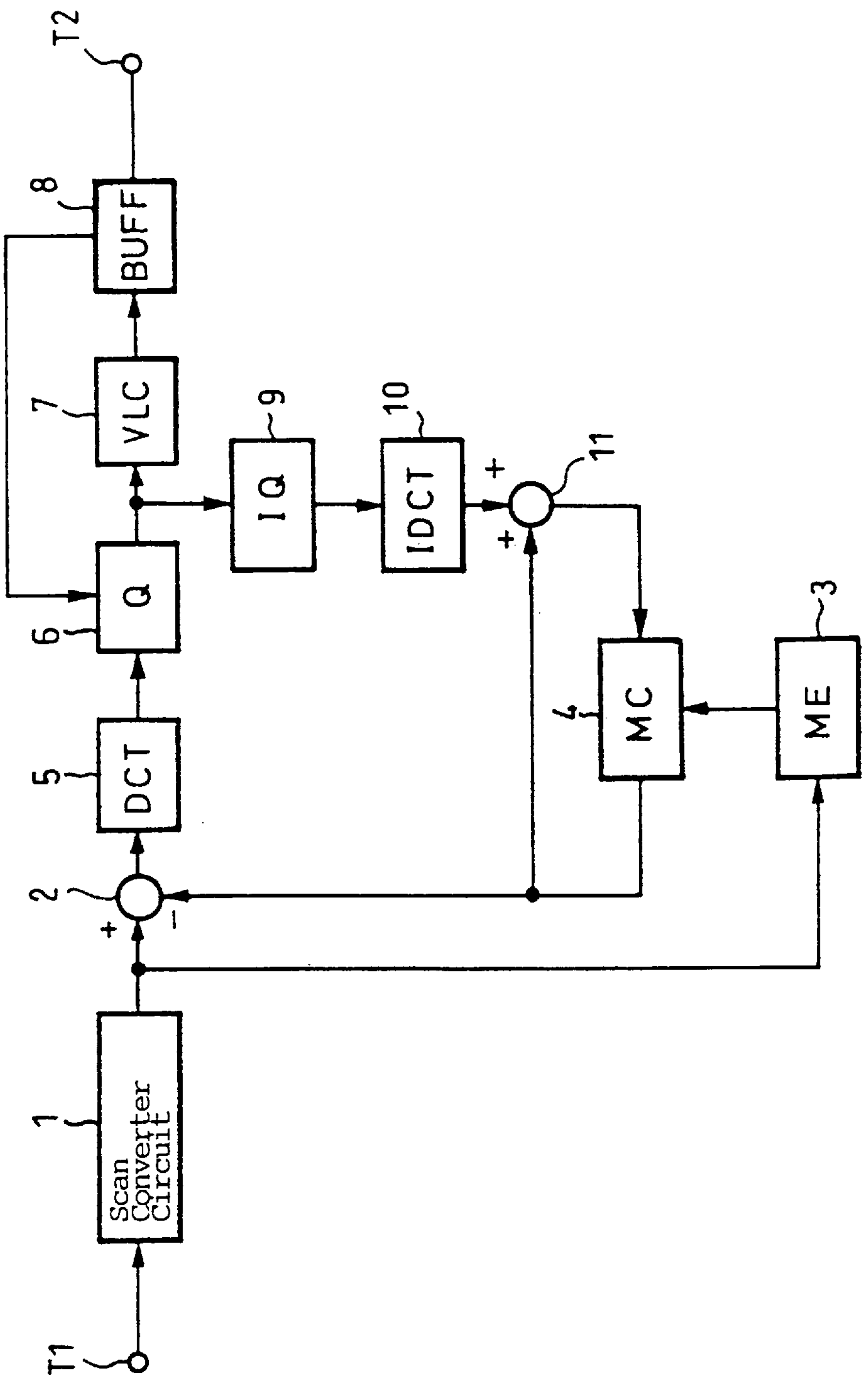
FIG. 7 is a block diagram showing an example of a conventional encoder for encoding.

A best mode carrying out the invention will hereinafter be described with reference to the accompanying drawings. FIG. 1 shows an arrangement of an encoder by way of example. Similarly to an arrangement of the encoder shown in FIG. 7, an encoder shown in FIG. 1 compresses a video data by employing combination of motion compensation and DCT. Parts and units corresponding to those shown in FIG. 7 are marked with the same reference numerals.

A scan converter circuit 1 divides each of input video data arranged in a processing order into data of macroblocks. The scan converter circuit supplies the data of the macroblocks to a main processing system and to a motion detection unit 3 for calculating a motion vector. The motion detection unit 3 calculates a motion vector with respect to the present macroblock with reference to a reference picture. A motion compensation unit 21 motion-compensates the data by using the motion vector. The motion compensation unit 21 uses the input picture data itself.

The macroblock data supplied to the main processing system are supplied through a FIFO (First In First Out) memory 22 to a subtracting circuit 2. If the macroblock data is to be processed for the intraframe coding, then the subtracting circuit does not carry out the subtraction processing. If the macroblock data is to be processed for the interframe coding, then the subtracting circuit carries out the subtraction processing employing a predictive picture supplied from the motion compensation unit 4. The subtracting circuit 2 is connected to a DCT processing unit 5. A coding processing in the main processing system including the subtracting circuit 2 and the DCT processing unit 5 is carried out similarly to that carried out in the arrangement shown in FIG. 7.

The arrangement is different from the arrangement shown in FIG. 7 in that the motion vector is supplied to the motion compensation unit 4 through a FIFO 23 and that a quantizer 6 quantizes DCT coefficient data with a quantizing step (or a target code length) determined as described later on.

When the code amount is controlled, the data is quantized with a plurality of quantizing steps, a code amount to be used upon an actual processing is estimated based on a code amount of the quantized data, and an optimum quantizing step is determined within a range which does not exceed the target code amount.

A picture data output from the motion compensation unit 21 is supplied to a subtracting circuit 24. The subtracting circuit 24 does not carry out a subtraction processing if the data is to be processed for the intraframe coding but carries out the subtraction processing if the data is to be processed for the interframe coding. The subtracting circuit 24 supplies output data to a DCT processing unit 25.

The DCT processing unit 25 subjects each of DCT blocks to DCT similarly to the DCT processing unit 5. The DCT processing unit 25 supplies coefficient data to a plurality of quantizers 26-1 to 26-n which quantize the coefficient data with quantizing steps indicated by different quantization indexes. The quantizers 26-1 to 26-n respectively supply their quantizing levels to converting circuits 27-1 to 27-n. The quantization indexes of the quantizers 26-1 to 26-n are controlled based on an output of a detecting circuit 29 with respect to each of the macroblocks. In this case, the quantization indexes are code signals for identifying the n quantizers, and each of the quantization indexes indicates the quantizing step determined with respect to each of the macroblocks in the GOP.

The detecting circuit 29 detects activity of the macroblock and changes the quantizing step in response to the detected result, where the activity means complexity of a picture information.

The detecting circuit 29 is supplied with the DCT coefficient data from the DCT processing unit 25 and detects the activity of the macroblock based on the DCT coefficient. For example, the detecting circuit checks distribution of low-frequency components and high-frequency components of the DCT coefficient, thereby detecting whether the picture of the macroblock is minute or flat.

Alternatively, for example, the detecting circuit checks color saturation with respect to each of the macroblocks and, if the saturation is high, then detects that the activity is high. Further, for example, the detecting circuit matches the picture of the macroblock with a pattern of a checker flag, thereby checking how minute the picture of the macroblock is. In this case, without using the coefficient data, the detecting circuit detects the activity from the picture data itself. If the detecting circuit 29 detects that the activity of the macroblock is high, then all the quantizing steps used in the quantizers 26-1 to 26-n are set smaller. If on the other hand the detecting circuit detects that the activity of the macroblock is low, then all the quantizing steps used in the quantizers 26-1 to 26-n are set larger.

The converting circuits 27-1 to 27-n generate data indicating code lengths of encoded outputs when the variable-length encoder 7 carries out the variable-length coding. The data of the code lengths are supplied to a quantization-index determining circuit 28. The quantization-index determining circuit 28 supplies the quantization index determined thereby to the quantizer 6 of the main processing system. The quantizer 6 of the main processing system quantizes the coefficient data with reference to the determined quantization index. The quantization index includes the quantization indexes determined with respect to each of the respective macroblocks. The quantization-index determining circuit 28 outputs these quantization indexes and transfers them together with a bit stream output. The data and the motion vector must be delayed by time required for determining the quantization index. FIFOs 22 and 23 are provided for the above delay operation.

Subsequently, control of the code amount will be described in detail. In this mode, length of codes in the GOP unit is set equal (i.e., an amount of generated codes is controlled to be smaller than a target amount of codes), and the quantization step is controlled with respect to every macroblock. It is assumed that the number of the macroblocks in the GOP is m.

The DCT processing unit 25 calculates the DCT coefficients F(i) (i=1 to m) of the respective DCT blocks of the macroblock. Then, the n quantizers 26-1 to 26-n calculates the quantization levels QF (i, j).

$$QF\ (i,\ j)=F(i)/\Delta(j)$$

In this equation, Δ(j) depicts each of the quantizing steps of the quantizers 26-1 to 26-n and also variable values which are controlled by the detecting circuit 29 with respect to each of the macroblocks. For example, a weight coefficient corresponding to the activity of the macroblock detected by the detecting circuit 29 is multiplied with the n fixed quantizing steps, thereby Δ(j) being formed. If i<j, Δ(j) is set so as to satisfy Δ(i)>Δ(j).

The converting circuits 27-1 to 27-n respectively convert the quantization levels QF (i, j) into the code lengths to obtain the code length L (i, j) of the macroblock i. The quantization index determining circuit 28 determines the quantization index based on this code length L (i, j) and the target code amount M of the GOP.

A sum of the code lengths of one GOP unit is calculated with respect to each of the n quantization indexes (j=1 to n).

$$SUM\ (j)=\Sigma\ L\ (i,\ j)$$

Σ depicts a sum of the values obtained when the numbers 1 to m are substituted for i of the above equation.

Subsequently, there is calculated a minimum value MINK of k satisfying M>SUM (k)' (k=1 to n). The value MINK is the quantization index to be calculated. The quantization index MINK indicates the m quantizing steps Δ(1) to Δ(n) of the GOP. Since a scale of a hardware prevents the quantizers whose number is n from being increased, a loss of the code amount of M−SUM (MINK) occurs.

In the above mode, the input picture is motion-compensated and the subtracting circuit 24 calculates the difference between the input picture and the motion-compensated one. The difference is quantized and the quantization level is converted into the code length. On the other hand, in the signal processing of the main processing system, a locally-decoded predictive picture is supplied to the subtracting circuit 2. A difference value from the subtracting circuit 2 is processed by the DCT processing unit 5. Since the input picture is thus used when the code amount is estimated, not n sets of arrangements (inverse quantizer and inverse DCT processing unit) but only one set of the arrangement is required for local decoding. Specifically, it is possible to simplify the arrangement of the hardware.

In general, motion compensation employing an original picture reduces generated-code amount as compared with motion compensation employing a locally decoded picture. In consideration of the difference between the code amounts, it is possible to improve accuracy of calculation of how much the codes are generated when the code amount is controlled. Specifically, a modified code length L' of the macroblock is L' (i, j)=L (i, j)×α (where α is a fixed value satisfying α>1).

A coefficient α used for the above modification must be transmitted.

Figure 2:
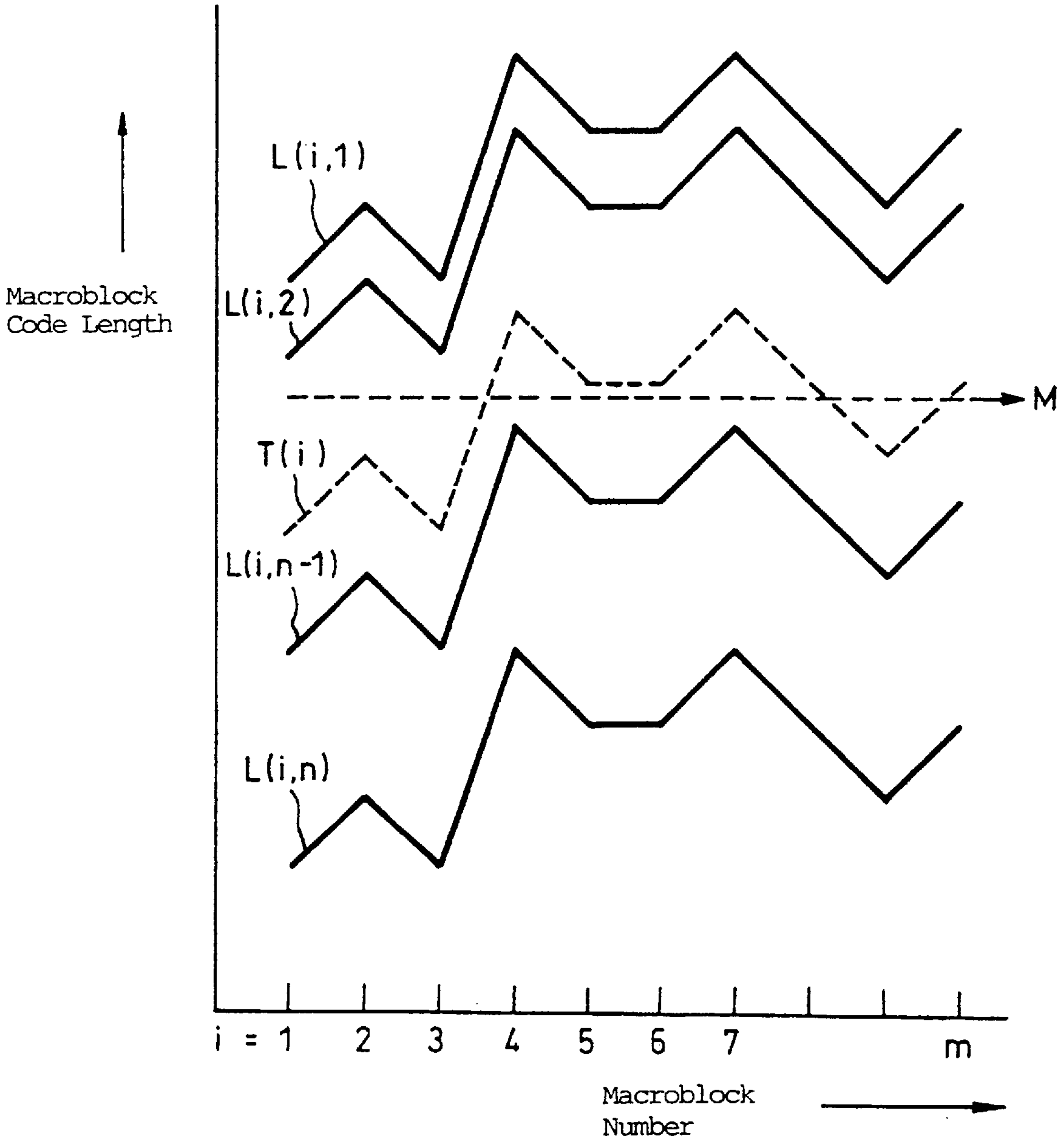
FIG. 2 is a graph showing a relationship between a macroblock code length and a macroblock number.

Moreover, the code amount of the GOP may be controlled, not by determining the quantizing step but by determining the target code length T (i) (i=1 to m) of each of the macroblocks. FIG. 2 is a graph used to explain calculation of the target code length of the macroblock. In FIG. 2, an abscissa represents the number of the m macroblocks in the GOP, and an ordinate represents the code length L (i, j) of the macroblock. FIG. 2 shows n changes (partially omitted) respectively corresponding to the n quantizers 26-1 to 26-n.

The target code length T (i) of each macroblock is calculated as follows.

Assuming that a minimum value of k satisfying M>SUM (k) (k=1 to n) is A and a maximum value of k satisfying M<SUM (k) (k=1 to n) is B, then T (i)={(SUM (B)−M)×(i, A)+(M−SUM (A)×L (i, B)}/(SUM (B)−SUM(A)) is established.

If the code length of each macroblock is determined as described above, then

Σ T (i, j)=M (where Σ depicts a sum of values of T (i, j) obtained when the number of i is changed from i=1 to i=m) is established. It is possible to carry out satisfactorily efficient control of the code amount which can basically prevent loss of the code amount from being generated.

As described above, the processing of determining the target code length is carried out by a block substituting for the quantization-index determining circuit 28 shown in FIG. 1. Then, the target code length is supplied to the quantizer 6. The quantizer 6 determines the quantizing step so that the generated code length of the macroblock should be set within the target code length. As this method, a method proposed in Japanese patent application No. 110858/1992 can be employed. Specifically, by utilizing the fact that the generated code length is monotonously decreased relative to the increase of the quantizing steps on the assumption that the number of the quantizing steps is a power of 2, the quantizing step is determined with a binary search method. The quantizer 6 quantizes data by the determined quantizing step. Therefore, in this case, the quantization index is output from the quantizer 6.

A transforming and encoding method is not limited to the DCT. The present invention can be applied to a wavelet transform, the Haar transform, the K-L transform and so on.

The present invention can be applied to a processing of recording the compression-coded data on a magnetic tape, a hard disk, and an magneto-optical disk.

Moreover, the arrangement of the macroblock is not limited to (4:2:2), and may be (4:2:0), (4:4:4), (4:1:1) and so on. The number of the DCT blocks contained in the macroblock is not limited to that described above.

Effects of the above-mentioned embodiment are as follows. Since the feed-forward control is employed, it is possible to avoid the problems involved in the feed-back control. Specifically, it is possible to control the data so that the frames of the predetermined number should be set within a certain predetermined bit rate, with preventing the reproduced picture from being damaged by sudden change of the data amount upon the scene change.

Since the quantizing step is changed depending upon the local characteristic of the picture, it is possible to improve the picture quality of the decoded picture. [another mode]

When the quantization-index determining circuit 28 of the encoder shown in FIG. 1 employs the binary search method, binary search circuits the number of which is equal to the number of bits of the quantization index are required. If the bit number of the quantization index is 5 bits, for example, then the five binary search circuits are required. Accordingly, it will hereinafter be considered to downsize a hardware by reducing the number of the binary search circuits.

Figure 3:
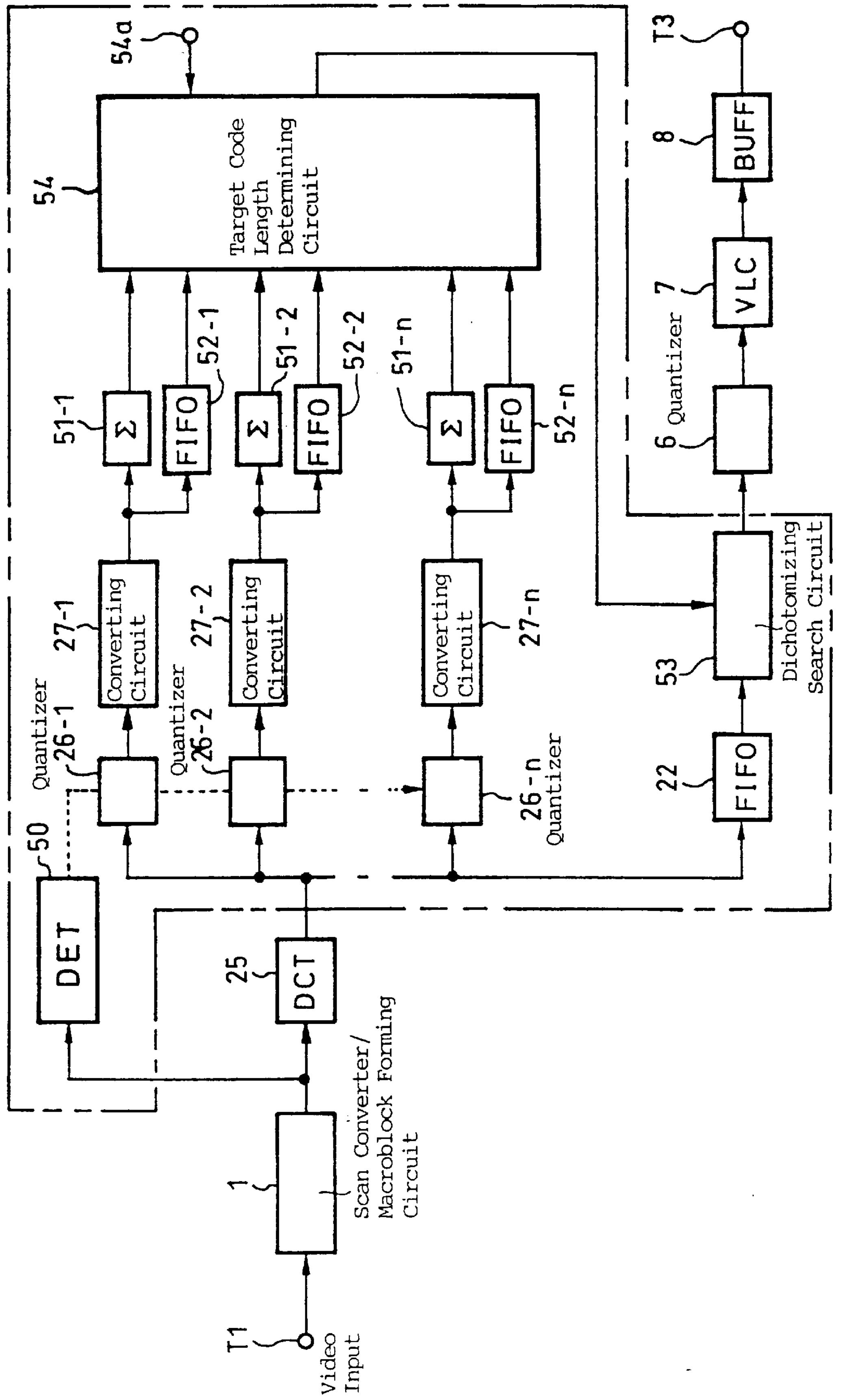
FIG. 3 is a block diagram showing another mode of the encoder for encoding.

FIG. 3 shows a detailed arrangement of the encoder shown in FIG. 1 employing the binary search method to facilitate the following explanation. The quantization-index determining circuit 28 shown in FIG. 1 includes, as shown in FIG. 3, integrating circuits 51-1 to 51-n, FIFOs 52-1 to 52-n, a target code length determining circuit 54 and a dichotomizing search circuit 53. An operation of determining a target code length by the integrating circuits 51-1 to 51-n, the FIFOs 52-1 to 52-n, the target code length determining circuit 54 and the dichotomizing search circuit 53 with employing the normal binary search method will hereinafter be described. By way of example, a circuit employing linear approximation method will be described. The integrating circuits 51-1 to 51-n integrate respective code-length data from the converting circuits 27-1 to 27-n by one frame amount, for example. The FIFOs 52-1 to 52-n delay the code length data corresponding to the respective quantization indexes by time required for the processing carried out by the integrating circuits 51-1 to 51-n.

It is assumed that the total number of the quantizing steps "0" to "31" is 32 and, in FIG. 3, "n" of reference numerals of the quantizers 26-1 to 26-n, the converting circuits 27-1 to 27-n, the integrating circuits 51-1 to 51-n and the FIFOs 52-1 to 52-n is "5", i.e., the number of each kind of the circuits is 5.

On the above assumption, the quantization indexes q [j] of the respective quantizers 51-j (j=1, 2, 3, 4, 5) are set as shown on Table 1.

TABLE 1

| Quantizer j | Quantization index q [j] |
|---|---|
| 1 | 0 |
| 2 | 7 |
| 3 | 15 |
| 4 | 23 |
| 5 | 31 |

Figure 4:
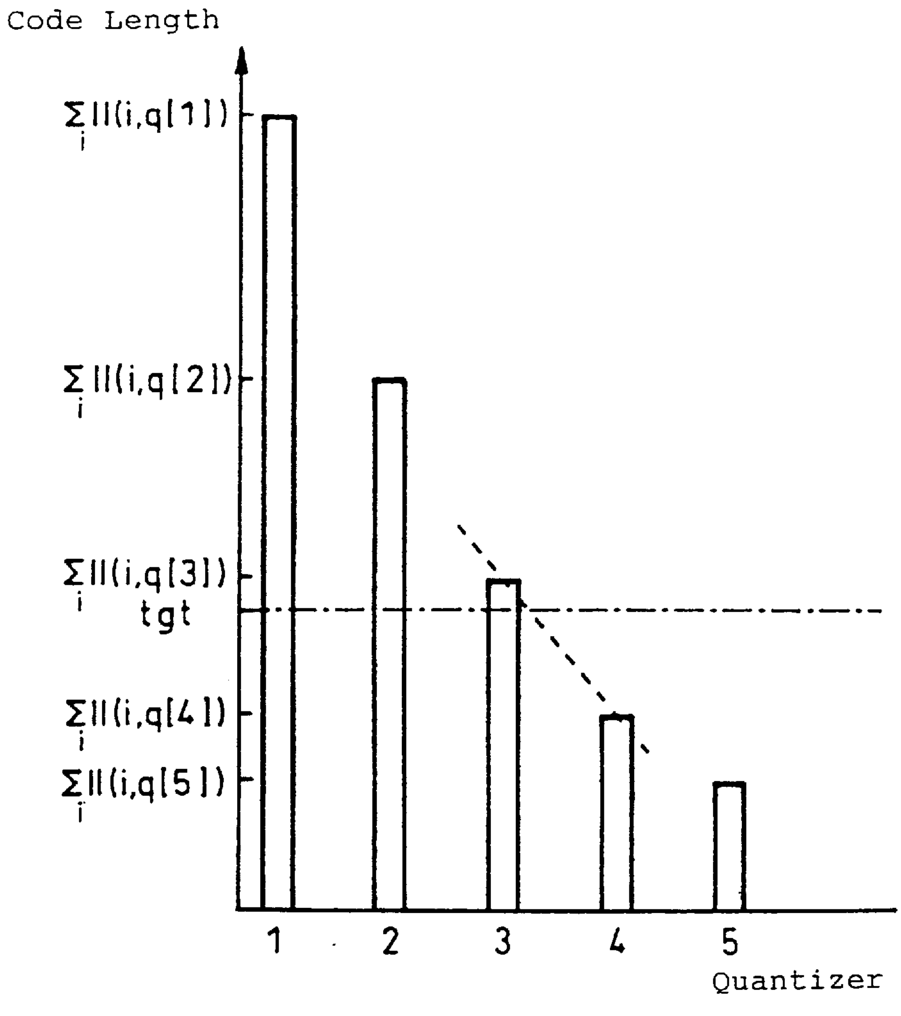
FIG. 4 is a graph showing a an integrated value of one frame amount of each of quantizers (fixed quantizers).

The code length of the ith macroblock processed by the quantizer j is set to ll (i, q[j]). When Σi ll (i, q[j]) is plotted, the integrated value of the code length of one frame amount processed by the quantizer j becomes as shown in FIG. 4. In FIG. 4, an ordinate represents a code length, and an abscissa represents the quantizer j. Reference symbol tgt represents a target code length input from the outside through an input terminal 54*a*.

Study of FIG. 4 reveals that the coefficient data from the DCT processing unit 25 are quantized by the quantizers 26-1 to 26-5 shown FIG. 3 with their respective fixed quantization indexes. Study of FIG. 4 reveals that the code lengths obtained by quantization of the quantizers 26-1 to 26-5 are respectively Σi ll (i, q [1]) to Σi ll (i, q [5]). As easily understood from FIG. 4, the target code length tgt is one between the code length Σi ll (i, q [3]) which is a code length obtained by quantization of the quantizer 26-3 and the code length Σi ll (i, q [4]) which is a code length obtained by quantization of the quantizer 26-4. A value in the above [] represents the number of the quantizer shown on the Table 1.

Specifically, the quantization index q [j] from which the target code length tgt can be obtained is one between the quantization index q [15] of the quantizer 26-3 and the quantization index q [23] of the quantizer 26-4. Therefore, study of FIG. 4 reveals that linear approximation between the code length Σi ll (i, q [3]) and the code length Σi ll (i, q [4]) allows the target code length of every macroblock satisfying the above target code length to be obtained.

Assuming that the target code length data of the macroblock j is ll (i), the target code length ll (i) can be calculated from the following equation 1.

$$ll(i) = \{(\Sigma k\, ll(k, q[3]) - tgt) \cdot ll(i, q[4]) + (tgt - \Sigma k\, ll(k, q[4])) \cdot ll(i, q[3])\} / \{\Sigma k\, ll(k, q[3]) - \Sigma k\, ll(k, q[4])\} \quad \text{(equation 1)}$$

In the above equation, the term (Σk ll (k, q [3])−tgt) represents the code length of the kth macroblock processed by the quantizer 3—the target code length, the term ll (i, q [4]) represents the code length of the ith macroblock processed by the quantizer 26-4, the term (tgt−Σk ll (k, q [4]) represents the target code length—the code length of the kth macroblock processed by the quantizer 26-4, the term ll (i, q [3]) represents the code length of the ith macroblock processed by the quantizer 26-3, and the term Σk ll (k, q [4]) represents the code length of the kth macroblock processed by the quantizer 26-4.

As shown in the above equation 1, the target code length data ll (i) of the macroblock j is determined by the target code length determining circuit 54 shown in FIG. 3. The target code length data ll (i) is supplied to the dichotomizing search circuit 53 shown in FIG. 3. On the other hand, the target code length determining circuit 54 has already known that the quantization index which allows the target code length tgt to be obtained is one between the quantization index q [15] of the quantizer 26-3 and the quantization index q [23] of the quantizer 26-4. Specifically, the target code length determining circuit 54 has already detected that the quantization index q [j] satisfying $\min_j$ (ll(i, q [j])≦ll (i)) is one between the q [15] and q [23].

A minimum quantization index satisfying the target code length data ll (i) supplied from the target code length determining circuit 54 is determined.

Figure 5:
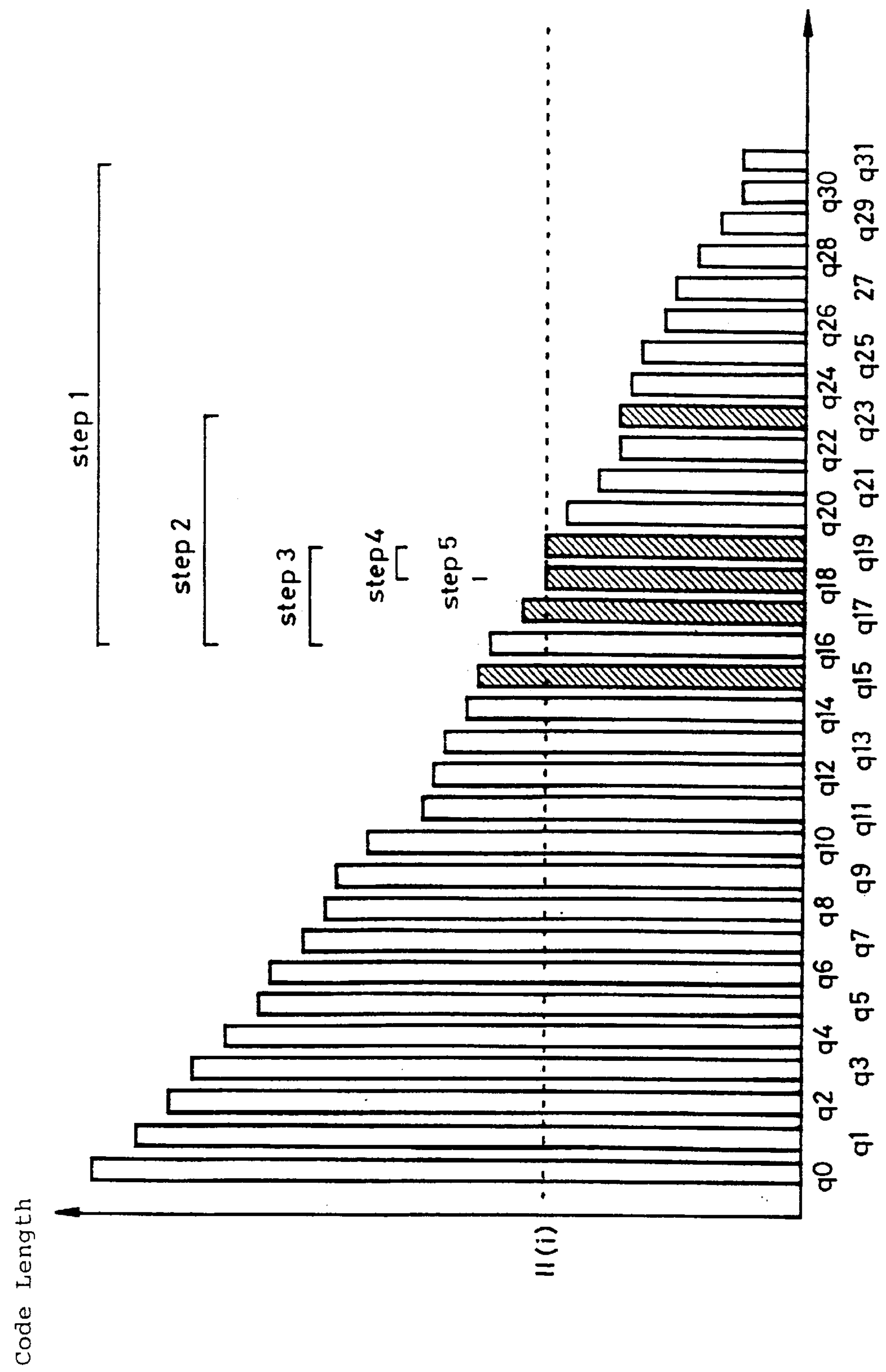
FIG. 5 is a graph used to explain a dichotomizing search method.

The binary search method will be described in detail with reference to FIG. 5. In FIG. 5, an abscissa represents the quantization index, and an ordinate represents the code length, respectively. FIG. 5 is a graph obtained by plotting the code length of data obtained by quantizing and variable-length coding the macroblock i with the 32 quantization indexes q0 to q31. It will be considered to calculate the minimum quantization index data q satisfying the target code length data ll (i), i.e., solution of qi=$\min_j$ (ll (i, q [j])≦ll (i)).

In this case, since the bit number of the quantization index is 5 bits, the respective bits from the uppermost bit to the lowest bit are successively calculated in five steps. A processing of calculating the respective bits from the uppermost bit to the lowermost bit of the quantization index in the five steps is as follows.

[step 1: a processing of detecting the uppermost bit]

In step 1 which is the first step, it is known only that the solution is within the range from q0 to q31. Then, there is calculated a point which divides the range of the solution into two, i.e., ll (i, q15) which is the code length data of the quantization index q15. The value of the code length data ll (i, q15) is larger than the value of the target code length data ll (i) as will be understood from FIG. 5, i.e., ll (i, q15)>ll (i). Study of the figure reveals that the solution is within the range from q16 to q31. Therefore, in step 1, the uppermost bit of the quantization index is determined as "1". This will be easily understood since the uppermost bit is "1" when any of the numbers "16" to "31" is expressed with five bits. "1xxxx" (where "x" means an unknown number) which is the result in step 1 will be used in step 2.

[step 2: a processing of detecting the second bit]

In step 2 which is the second step of the processing, it is known that the solution is within the range from q16 to q31 by the processing in the above step 1. In step 2, there is calculated a point which divides the range of the solution into two, i.e., ll (i, q23) which is the code length data of the quantization index q23. FIG. 5 shows that the value of the code length code ll (i, q23) is smaller than the target code length data ll (i), i.e., ll (i, q23)<ll (i). Study of the figure reveals that the solution is within the range from q16 to q23. Therefore, in step 2, the second bit of the quantization index is determined as "0". This will be easily understood since the second bit in the descending order is "0" when any of the numbers "16" to "23" is expressed with five bits. "10xxx" (where "x" means an unknown number) which is the result in step 2 will be used in step 3.

[step 3: a processing of detecting the third bit]

In step 3 which is the third step of the processing, it is known by the process in the above step 2 that the solution is within the range from q16 to q23. In this step, there is calculated a point which divides the range of the solution into two, i.e., ll (i, q19) which is the code length data of the quantization index q19. FIG. 5 shows that the value of the code length code ll (i, q19) is equal to or smaller than the target code length data ll (i), i.e., ll (i, q19)≦ll (i). More precisely, FIG. 5 shows that the target code length data ll (i, q19) is equal to the target code length data ll (i), i.e., ll (i, q19)+ll (i). Study of the figure reveals more precisely that the solution is within the range from q16 to q19.

Therefore, in step 3, the third bit of the quantization index is determined as "0". This will be easily understood since the third bit in the descending order is "0" when any of the numbers "16" to "19" is expressed with five bits. "100xx" (where "x" means an unknown number) which is the result in step 3 will be used in step 4.

[step 4: a processing of detecting the fourth bit]

In step 4 which is the fourth step of the processing, it is known by the process in the above step 3 that the solution is within the range from q16 to q19. In step 4, there is calculated a point which divides the range of the solution into two, i.e., ll (i, q17) which is the code length data of the quantization index q17. FIG. 5 shows that the value of the code length code ll (i, q17) is larger than the target code length data ll (i), i.e., ll (i, q17)>ll (i). Study of the figure reveals that the solution is within the range from q18 to q19. Therefore, in step 4, the fourth bit of the quantization index is determined as "1". This will be easily understood since the fourth bit in the descending order is "1" when any of the numbers "18" to "19" is expressed with five bits. "100x" (where "x" means an unknown number) which is the result in step 4 will be used in step 5.

[step 5: a processing of detecting the fifth bit by the fifth binary search circuit]

In step 5 which is the fifth step of the processing, it is known by the process in the above step 4 that the solution is within the range from q18 to q19. In this step, there is calculated a point which divides the range of the solution into two, i.e., ll (i, q18) which is the code length data of the quantization index q18. FIG. 5 shows that the value of the code length code ll (i, q18) is equal to or smaller than the target code length data ll (i), i.e., ll (i, q18)≦ll (i). More precisely, study of FIG. 5 reveals that the value of the code length data ll (i, q18) is equal to the code length data ll (i), i.e., ll (i, q18)=ll (i) and hence that the solution is within the range from q18 to q18, i.e., that the solution is q18. Therefore, in step 5, the lowest bit of the quantization index is determined as "0". This will be easily understood since the lowest bit in the descending order is "0" when the number "18" is expressed with five bits. "10010" is used as the quantization index employed in the quantizer 6.

As described above, when the binary search method is employed, employment of the five processing steps allows the quantization index to be reliably calculated. However, since the five processing steps must be employed, the dichotomizing search circuit 53 shown in FIG. 3 must be formed of the five binary search circuits, which increases the scale of the hardware. Therefore, it will be considered in the present mode how to minimize the number of the binary search circuits.

As described above, the target code length determining circuit 54 has already known that the quantization index allowing the target code length tgt to be obtained is one between the quantization index q [15] of the quantizer 26-3 and the quantization index q [23] of the quantizer 26-4. Specifically, the target code length determining circuit 54 has already detected that the quantization index q [j] satisfying $\min_j$ (ll (i, q [j])≦ll (i)) is q [15] and q [23]. Therefore, in this mode, the target code length determining circuit 54 supplies the above quantization indexes q [15] and q [23] to the dichotomizing search circuit 53, and the information that the quantization index q [j] allowing the target code length tgt to be obtained is one between the above quantization indexes q [15] and q [23] is actively utilized.

Specifically, since the target code length determining circuit 54 has already calculated the target code length ll [i] of the macroblock i and the quantization index q [j] which is $\min_j$ (ll (i, q [j]≦ll (i)), active utilization of this information leads to initial recognition that the solution is within the range from q [j−1] to q [j]. In the example shown on Table 1, while the solution is within the range of 32 numbers from "0" to "31" in the normal dichotomizing search method, in this mode, the range of the solution can be reduced to the range of eight numbers from "15" to "23". Specifically, in this example, the solution is within the range which is larger than q [3] (=q15) and equal to or smaller than q [4] (=q23). Therefore, in this mode, the processing can be started from the step 3 of the above dichotomizing search method.

Specifically, since the target code length determining circuit 54 has already known that the solution is within the range from q [3] (=q15) to q [4] (=q23), the dichotomizing search circuit 53 may start the binary search processing from step 3 without carrying out the processings in steps 1, 2. This means that the number of the binary search circuits forming the dichotomizing search circuit 53 shown in FIG. 3 can be reduced from five to three. The number of binary search steps can be expressed by the following equation 2:

$$\text{number of binary search steps} = \log_2 \text{deference of quantization index of quantizer} \quad \text{(equation 2)}$$

Practically, the quantization indexes given to the quantizers 26-1 to 26-n can be changed based on the activity calculated by the detecting circuit 50. However, even in this case, it is possible to carry out the binary search processing with the number of binary search steps required when the maximum value of difference between the quantization indexes of the quantizers 26-1 to 26-n is substituted for a term of the above equation 2.

An operation of the encoder shown in FIG. 3 will be described with reference to FIG. 6.

Figures 6A, 6B, 6C, 6D, 6E, 6F, 6G, 6H, 6I, 6J, 6K:
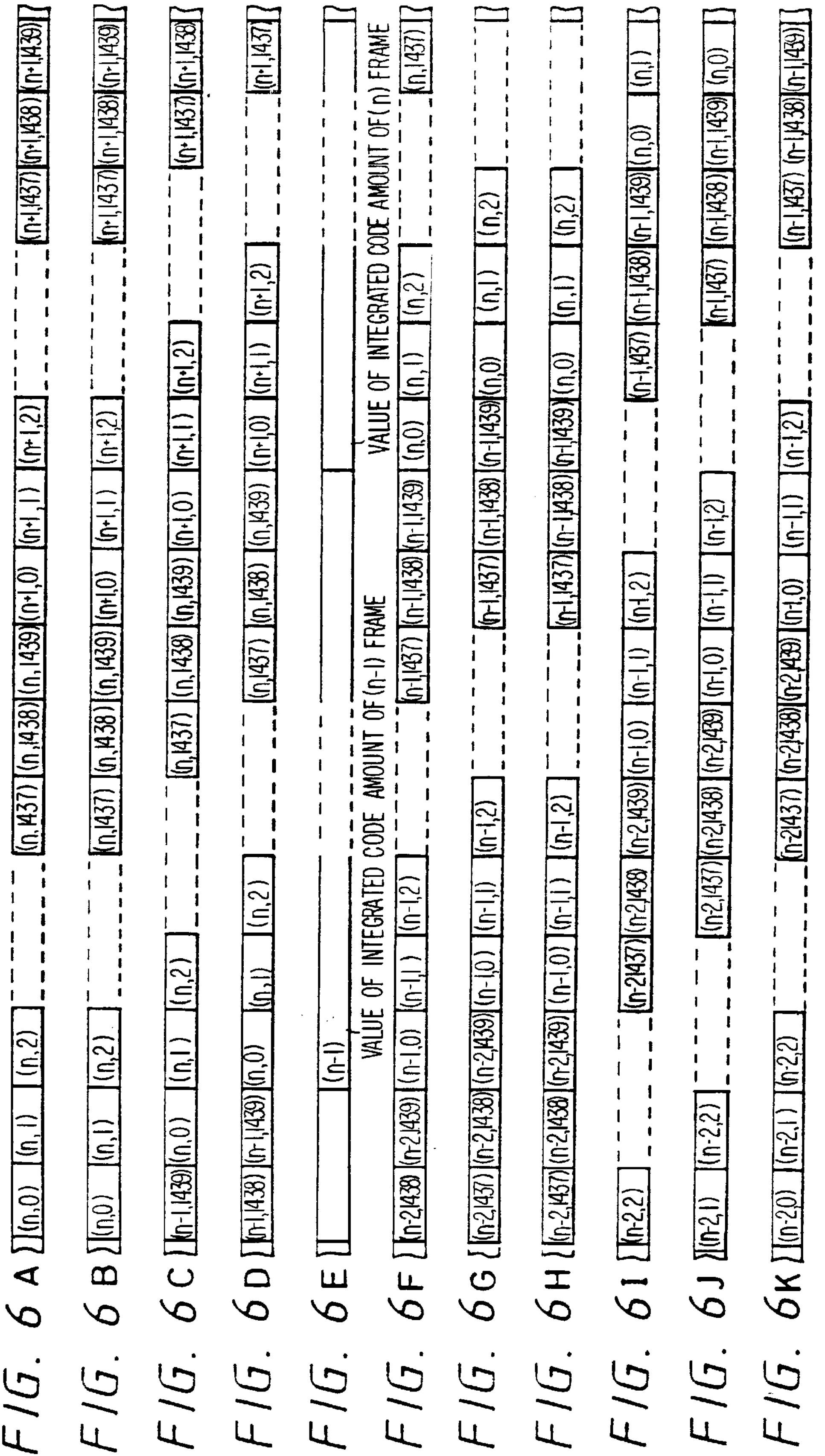
FIGS. 6A–6K are timing charts used to explain an operation of the encoder shown in FIG. 3.

FIG. 6A shows an output indicative of the detected activity. FIG. 6B shows a DCT output. FIG. 6C shows a quantized output. FIG. 6D shows a converted output. FIG. 6E shows an integrated output. FIG. 6F shows an FIFO output. FIG. 6G shows an output indicative of the determined target code length. FIG. 6H shows an FIFO output. FIG. 6I shows an output of the binary search processing. FIG. 6J shows a quantized output. FIG. 6K shows a variable code length coded output. The frame number and the number of the macroblock of the frame are marked in each of parentheses shown in FIGS. 6A to 6K. For example, "(n+1, 1439)" means "1439th" macroblock of "n+1th" frame. In this example, it is assumed that one frame includes 1440 macroblocks from 0th macroblock to 1439th macroblock.

The video signal is input to an input terminal T1 shown in FIG. 3. The scan converter circuit 1 converts the video signal into the data of a frame unit and then converts the data of a frame unit into data of a block unit. The scan converter circuit supplies the video signal converted into the data of a block unit to the detecting circuit 50 which detects the activity. The DCT processing unit 25 converts the video signal converted into the data of a block unit into the coefficient data indicative of data of range from a DC component to a high-order AC component. The detecting circuit supplies the output signal indicative of the detected activity shown in FIG. 6A to the respective quantizers 26-1 to 26-n. On the other hand, the DCT processing unit 25 supplies the DCT output signal shown in FIG. 6B to the respective quantizers 26-1 to 26-n which quantize the output signal.

The quantizers 26-1 to 26-n supplies the quantized outputs shown in FIG. 6C to the converting circuits 27-1 to 27-n. The respective converting circuits 27-1 to 27-n converts the quantized outputs from the quantizers 26-1 to 26-n into the code length data, and supplies the converted outputs shown in FIG. 6D to the integrating circuits 51-1 to 51-n and also to the FIFOs 52-1 to 52-n, respectively. As shown in FIG. 6E, the integrating circuits 51-1 to 51-n integrate the code length data of respective frames. The integrated outputs shown in FIG. 6E and the FIFO outputs shown in FIG. 6F are respectively supplied to the target code length determining circuit 54.

As described above, the target code length determining circuit 54 calculates the target code length data ll (i) and the quantization index which is most approximate to the quantization index allowing the target code length data to be obtained. The output, shown in FIG. 6G, indicative of the determined target code length from the target code length determining circuit 54 is supplied to the dichotomizing search circuit 53. On the other hand, the DCT output from the DCT processing unit 25 is supplied to the FIFO 22 which delays it once. As described above, the dichotomizing search circuit 53 carries out the binary search processing only between the two quantization indexes which are most approximate to the quantization index allowing the target code length to be obtained, based on the information from the target code length determining circuit 54. The FIFO output shown in FIG. 6H is output at the timing when the dichotomizing search circuit finishes the binary search processing and obtains the quantization index. Therefore, the FIFO output shown in FIG. 6H and the output indicative of the result of the binary search processing shown in FIG. 6I are supplied to the quantizer 6 simultaneously.

The FIFO output supplied to the quantizer 6 is quantized with the quantization index which is the output indicative of the result of the binary search processing shown in FIG. 6I. The quantized output shown in FIG. 6J is supplied to and encoded by the variable length encoding circuit 7. The variable-length-encoded output shown in FIG. 6K is output through the buffer 8 from an output terminal T3 and then output therefrom as a bit steam output.

[modification example]

1. While the DCT is employed for the transform and encoding in the above mode, the wavelet transform, the Haar transform, the K-L transform and so on may be employed.
2. While in the above mode the VTR is employed, the recording medium is not limited to a tape and may be a magneto-optical recording disk or a hard disk. The present invention can be applied to a system which does not employ a recording medium, e.g., a communication system or the like.
3. While in the above mode the structure of macroblock according to 4:2:2 format is described, structure of a macroblock according to 4::2:0 format, 4:4:4 format or 4:4:1 format may be employed. There is no limit in the number of the DCT blocks forming the macroblocks.
4. While in the above mode the bit rate is controlled to be constant in one frame unit, the unit may be a larger unit or a smaller unit.
5. While in this mode the bit reduction in a still picture is described, the present invention can be applied to bit reduction of a moving picture by forming the DCT 25 shown in FIG. 3 of a motion detection circuit and a DCT.
6. While in the above mode the quantizer (fixed quantizer) employs interpolation employing linear approximation as a predictive method of the target code length, approximation employing a high-order function using a larger number of points may be carried out.
7. While in the above mode the data which is not subjected to the DCT is employed in the method for calculating the activity, the data subjected to the DCT may be employed to calculate the activity.

[effect achieved by the embodiment]

As described above, in this embodiment, since the binary search processing is carried out only between the two quantization indexes calculated by the target code length determining circuit 54, there can be achieved a great effect in which the binary search circuits forming the dichotomizing search circuit 53 can be reduced as compared with the conventional method. Moreover, there can be achieved simultaneously an effect in which it is possible to achieve the feed-forward coded-picture control that prevents the picture of even an application such as the VTR from being disturbed while the local characteristics of the video signal are being considered.

INDUSTRIAL APPLICABILITY

The method of encoding the video signal and the apparatus therefor according to the present invention are suitable for the VTR, a magneto-optical disk drive, a hard disk drive, a silicon disk drive, a data transmission apparatus, a communication system or the like, for example. It is possible to improve the picture quality of the decoded picture by changing the quantization step in response to the local characteristics of the picture such as a minute picture of a macroblock or the like. When the code amount is estimated, the input video signal is motion-compensated, which makes it unnecessary to provide the arrangement for the local decoding corresponding to a plurality of quantization steps. By reducing the processing steps of the code amount control, it is possible to simplify the arrangement.

We claim:

1. A method of encoding a video signal using feedforwarding wherein quantizing said video signal is not based on feed back signals, said method comprising the steps of:

detecting the complexity, on the basis of color saturation, of picture information of said video signal to control a quantizing step based on said complexity;

quantizing a motion compensated difference of said video signal with different quantizing steps in response to said complexity detected, comparing generated code lengths of a plurality of resultant quantized outputs with a target code length, and determining a quantization index indicative of a quantizing step based on the result of said comparison;

quantizing said video signal with the quantizing step based on said quantization index; and subjecting the quantized video signal to a variable length encoding processing.

2. A method of encoding a video signal according to claim 1, further comprising the step of, when said quantization index is determined, searching a value of the target quantization index indicative of a target quantizing step size allowing said target code length to be obtained, only between two quantization indexes respectively indicating two quantizing steps which allow two generated code lengths most approximate to a value of said target code length.

3. A method of encoding a video signal using feedforwarding wherein quantizing said video signal is not based on feedback signals, comprising the steps of:

detecting the complexity, on the basis of color saturation, of picture information of a video signal to control a quantizing step based on said complexity;

quantizing a motion compensated difference of said video signal with different quantizing steps by using first to nth quantizing means in response to said complexity detected;

converting respective quantized outputs from said first to nth quantizing means into generated code length informations;

comparing generated code length information with a target code length to determine a target quantization index indicative of a target quantizing step based on the result of said comparison;

quantizing said video signal with the quantizing step based on said quantization index; and subjecting the quantized video signal to a variable length encoding processing.

4. A method of encoding a video signal according to claim 3, further comprising the step of, when said quantization index is determined, searching a value of the target quantization index indicative of a target quantizing step size allowing said target code length to be obtained, only between two quantization indexes respectively indicating two quantizing steps which allow two generated code lengths most approximate to a value of said target code length.

5. A video signal encoding apparatus for encoding a video signal using feedforwarding wherein quantizing said video signal is not based on feedback signals, said apparatus comprising:

complexity detecting means for detecting the complexity, on the basis of color saturation, of picture information of said video signal to control a quantizing step based on said complexity;

quantization index determining means for quantizing a motion compensated difference of said video signal with different quantizing steps in response to said complexity detected by said complexity detecting means, comparing generated code lengths of a plurality of resultant quantized outputs with a target code length, and determining a quantization index indicative of a quantizing step based on the result of said comparison; and quantizing means for quantizing said video signal with the quantizing step based on said quantization index, wherein the quantized video signal is subjected to a variable length encoding processing.

6. A video signal encoding apparatus according to claim 5, wherein said quantizing index determining means further searches a value of the target quantization index indicative of a target quantizing step size allowing said target code length to be obtained, only between two quantization indexes respectively indicating two quantizing steps which allow two generated code lengths most approximate to a value of said target code length.

7. A video signal encoding apparatus for encoding a video signal using feedforwarding wherein quantizing said video signal is not based on feedback signals, said apparatus comprising:

complexity detecting means for detecting the complexity, on the basis of color saturation, of picture information of said video signal to control a quantizing step based on said complexity;

first to nth quantizing means for quantizing a motion compensated difference of said video signal with different quantizing steps in response to said complexity detected by said complexity detecting means;

converting means for converting respective quantized outputs from said first to nth quantizing means into generated-code-length informations;

quantization index determining means for comparing generated code length information from said converting means with a target code length information to determine a quantization index indicative of a quantizing step based on the result of said comparison; and quantizing means for quantizing said video signal with the quantizing step based on said quantization index from said quantization index determining means, wherein the quantized video signal is subjected to a variable length encoding processing.

8. A video signal encoding apparatus according to claim 7, wherein said quantizing index determining means further searches a value of the target quantization index indicative of a target quantizing step size allowing said target code length to be obtained, only between two quantization indexes respectively indicating two quantizing steps which allow two generated code lengths most approximate to a value of said target code length.

9. A method of encoding a video signal according to claim 1, wherein said step of detecting detects the distribution of low-frequency components and high-frequency components in said video signal.

10. A method of encoding a video signal according to claim 9, wherein said step of detecting detects that said complexity is high when color saturation of said picture information is high and detects that said complexity is low when said color saturation of said picture information is low.

11. A method of encoding a video signal according to claim 1, further comprising the step of motion compensating according to the MPEG standard an inverse-quantized video signal of said video signal quantized in said step of quantizing.

12. A method of encoding a video signal according to claim 11, further comprising the step of motion compensating said video signal according to the MPEG standard.

13. A video signal encoding apparatus according to claim 5, wherein said complexity detecting means detects the distribution of low-frequency components and high-frequency components in said video signal.

14. A video signal encoding apparatus according to claim 13, wherein said complexity detecting means detects that said complexity is high when color saturation of said picture information is high and detects that said complexity is low when said color saturation of said picture information is low.

15. A video signal encoding apparatus according to claim 5, further comprising first motion compensating means for motion compensating according to the MPEG standard an inverse-quantized video signal of said video signal quantized by said quantizing means.

16. A video signal encoding apparatus according to claim 15, further comprising second motion compensating means for motion compensating said video signal according to the MPEG standard thereby producing said motion compensated difference of said video signal quantized by said quantization index determining means.

* * * * *